United States Patent
Chou et al.

(10) Patent No.: US 8,446,257 B2
(45) Date of Patent: May 21, 2013

(54) RADIO FREQUENCY CHARGING SYSTEM

(75) Inventors: Feng-Jian Chou, Hsinchu Hsien (TW); Chih-Yuan Hsieh, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 566 days.

(21) Appl. No.: 12/652,423

(22) Filed: Jan. 5, 2010

(65) Prior Publication Data
US 2010/0176934 A1    Jul. 15, 2010

(30) Foreign Application Priority Data
Jan. 14, 2009  (TW) ................................ 98101288 A

(51) Int. Cl.
*H04Q 5/22*    (2006.01)

(52) U.S. Cl.
USPC ................. 340/10.34; 340/13.24; 340/572.4

(58) Field of Classification Search
CPC ................................................ G06K 19/0723
USPC ................ 340/10.1, 10.5, 10.4, 10.34, 13.25, 340/572.4
See application file for complete search history.

(56) References Cited

U.S. PATENT DOCUMENTS

| | | | | |
|---|---|---|---|---|
| 5,144,294 A * | 9/1992 | Alonzi et al. | .................. | 340/8.1 |
| 5,952,922 A * | 9/1999 | Shober | ........................ | 340/572.4 |
| 6,008,727 A * | 12/1999 | Want et al. | ................. | 340/572.1 |
| 6,127,928 A * | 10/2000 | Issacman et al. | .......... | 340/572.1 |
| 6,943,688 B2 * | 9/2005 | Chung et al. | ............... | 340/572.7 |
| 7,019,650 B2 * | 3/2006 | Volpi et al. | ................. | 340/572.1 |
| 7,049,933 B1 * | 5/2006 | Koerner | ....................... | 340/10.1 |
| 7,054,595 B2 * | 5/2006 | Bann | ............................ | 455/41.2 |
| 7,280,045 B2 * | 10/2007 | Saarisalo et al. | ........... | 340/572.7 |
| 7,301,783 B2 * | 11/2007 | Homer et al. | ................. | 361/816 |
| 7,317,379 B2 * | 1/2008 | Kimura | ....................... | 340/10.51 |
| 7,423,516 B2 * | 9/2008 | Overhultz | .................... | 340/10.5 |
| 7,423,535 B2 * | 9/2008 | Chung et al. | ............... | 340/572.4 |
| 7,541,930 B2 * | 6/2009 | Saarisalo et al. | ........... | 340/572.7 |
| 7,701,344 B2 * | 4/2010 | Mattice et al. | ............. | 340/572.1 |
| 7,978,066 B2 * | 7/2011 | Lim et al. | ................. | 340/539.13 |
| 8,044,804 B1 * | 10/2011 | McReynolds | ............... | 340/572.4 |
| 8,081,075 B2 * | 12/2011 | Irmscher et al. | ........... | 340/568.2 |
| 8,099,045 B2 * | 1/2012 | Chang | .......................... | 455/41.1 |
| 2002/0021250 A1 * | 2/2002 | Asano et al. | .................. | 343/702 |
| 2002/0057191 A1 * | 5/2002 | Bates et al. | .................. | 340/10.1 |

(Continued)

FOREIGN PATENT DOCUMENTS

| CN | 1560788 A | 1/2005 |
|---|---|---|
| WO | 2008016527 A2 | 2/2008 |

OTHER PUBLICATIONS

Chinese Patent Office, Office Action 0910048CN, Jun. 15, 2011, pp. 1-4.

*Primary Examiner* — Brent Swarthout
*Assistant Examiner* — Rufus Point
(74) *Attorney, Agent, or Firm* — Edell, Shapiro & Finnan, LLC

(57) ABSTRACT

A radio frequency (RF) charging system is capable of charging an RF device on a display panel to increase charging efficiency. The RF device generates a response signal upon receiving an RF signal. The RF charging system includes an antenna set having a plurality of antennas, a switch unit, an RF module and a microcontroller unit (MCU). The MCU controls the switch unit to select one antenna from the antenna set. The antenna is able to receive the response signal and is used for transmitting the RF signal, thereby charging the RF device.

15 Claims, 5 Drawing Sheets

U.S. PATENT DOCUMENTS

| | | | |
|---|---|---|---|
| 2003/0016142 A1* | 1/2003 | Holmes et al. | 340/870.11 |
| 2003/0151511 A1* | 8/2003 | Duncan et al. | 340/572.1 |
| 2003/0222823 A1* | 12/2003 | Flint et al. | 343/702 |
| 2004/0227682 A1* | 11/2004 | Anderson | 343/742 |
| 2005/0099309 A1* | 5/2005 | Hum et al. | 340/573.4 |
| 2005/0179604 A1* | 8/2005 | Liu et al. | 343/742 |
| 2005/0242958 A1* | 11/2005 | Lyon et al. | 340/572.7 |
| 2006/0109125 A1* | 5/2006 | Overhultz et al. | 340/572.1 |
| 2006/0181393 A1* | 8/2006 | Raphaeli | 340/10.1 |
| 2006/0195162 A1* | 8/2006 | Arx et al. | 607/60 |
| 2006/0226989 A1* | 10/2006 | Hillegass | 340/572.7 |
| 2006/0238370 A1* | 10/2006 | Park et al. | 340/825.49 |
| 2007/0037529 A1* | 2/2007 | Nagai et al. | 455/101 |
| 2008/0266192 A1* | 10/2008 | Tuttle | 343/756 |
| 2008/0297314 A1* | 12/2008 | Kuwako et al. | 340/10.1 |
| 2009/0128360 A1* | 5/2009 | Bianchi et al. | 340/825.49 |
| 2009/0256672 A1* | 10/2009 | Yamamoto et al. | 340/5.2 |
| 2010/0026457 A1* | 2/2010 | Holloway | 340/10.1 |
| 2010/0164710 A1* | 7/2010 | Chung et al. | 340/539.1 |
| 2010/0188211 A1* | 7/2010 | Brommer et al. | 340/539.32 |
| 2011/0279238 A1* | 11/2011 | Brommer et al. | 340/10.1 |

\* cited by examiner

RADIO FREQUENCY CHARGING SYSTEM

CROSS REFERENCE TO RELATED PATENT APPLICATION

This patent application is based on Taiwan, R.O.C. patent application No. 98101288, filed on Jan. 14, 2009.

FIELD OF THE INVENTION

The present invention relates to a radio frequency (RF) charging technology, and more particularly, to an RF charging system and a method capable of charging an RF device on a display panel.

BACKGROUND OF THE INVENTION

In recent years, as RF communication technology has progressed, various applications of near field communication (NFC) have been developed. For example, in a surface computer 10 as illustrated in FIG. 1, an RF device 11 such as a mobile phone or a radio frequency identification (RFID) tag is placed on a display panel 12. In this way, the RF device 11 can communicate with a host computer 14 through an RF module 13, which includes an antenna and an associated RF circuit and is located at the back side of the display panel 12. For example, the RF device 11 first sends pictures stored therein to the host computer 14, and after having been processed and transmitted by the host computer 14, the pictures are displayed near the RF device 11 at the display panel 12 for a user to view.

However, when the RF device 11 communicates with the host computer 14, especially when a large amount of information is transmitted, power of the RF device 11 is consumed rapidly. Therefore, the surface computer 10 needs an RF charging capability in order to charge the RF device 11 and prevent the power depletion of the RF device 11.

SUMMARY OF THE INVENTION

In view of the foregoing issues, one object of the present invention is to provide an RF charging system and method capable of charging an RF device of a display panel and of improving charging efficiency.

An RF charging system for charging an RF device is provided according to an embodiment of the present invention. The RF device generates a response signal upon receiving an RF signal. The RF charging system comprises an antenna set having a plurality of antennas; a switch unit coupled to the antenna set; an RF module, coupled to the switch unit, for generating the RF signal; and a microcontroller unit (MCU), coupled to the switch unit and the RF module, for controlling the switch unit to select from the antenna set one antenna capable of receiving the response signal to transmit the RF signal, thereby charging the RF device.

An RF charging method for charging an RF device is further provided according to an embodiment of the present invention. The RF device generates a response signal upon receiving an RF signal. The RF charging method comprises steps of providing an antenna set having a plurality of antennas, generating the RF signal, and selecting from the antenna set one antenna capable of receiving the response signal to transmit the RF signal, thereby charging the RF device.

An RF charging system for charging an RF device is provided according to another embodiment of the present invention. The RF device generates a response signal upon receiving an RF signal. The RF charging system comprises a display panel for detecting a position of the RF device; an antenna set having a plurality of antennas; a switch unit coupled to the antenna set; an RF module, coupled to the switch unit, for generating the RF signal; and an MCU, coupled to the display panel, the switch unit and the RF module, for controlling the switch unit to select from the antenna set one antenna, so as to transmit the RF signal generated by the RF module and determine whether the selected antenna receives the response signal. Via the selected antenna capable of receiving the response signal and transmitting the RF signal, the MCU charges the RF device. When a position of the RF device indicates that the RF device is not within a predetermined area of the display panel, the microprocessor controls the display panel to display the predetermined area.

An RF charging method for charging an RF device is provided according to yet another embodiment of the present invention. The RF device generates a response signal upon receiving an RF signal. The RF charging method comprises steps of providing a display panel with a positioning capability, providing an antenna set having a plurality of antennas, generating the RF signal and selecting from the antenna set one antenna for transmitting the RF signal, determining whether the RF device is within a predetermined area of the display panel, displaying the predetermined area when the RF device is not in the predetermined area, and selecting an antenna capable of receiving the response signal and transmitting the RF signal via the selected antenna, thereby charging the RF device.

One advantage of the RF charging system and method thereof according to the present invention is that, an RF device can be positioned on a display panel when the RF device is being charged. When it is determined that the RF device is not within a predetermined area, e.g., an area where an antenna has better transmitting/receiving efficiency, the predetermined area is displayed on the display panel to direct a user to relocate the RF device to the predetermined area, thereby increasing charging efficiency.

DETAILED DESCRIPTION OF THE PREFERRED EMBODIMENT

Figure 1:
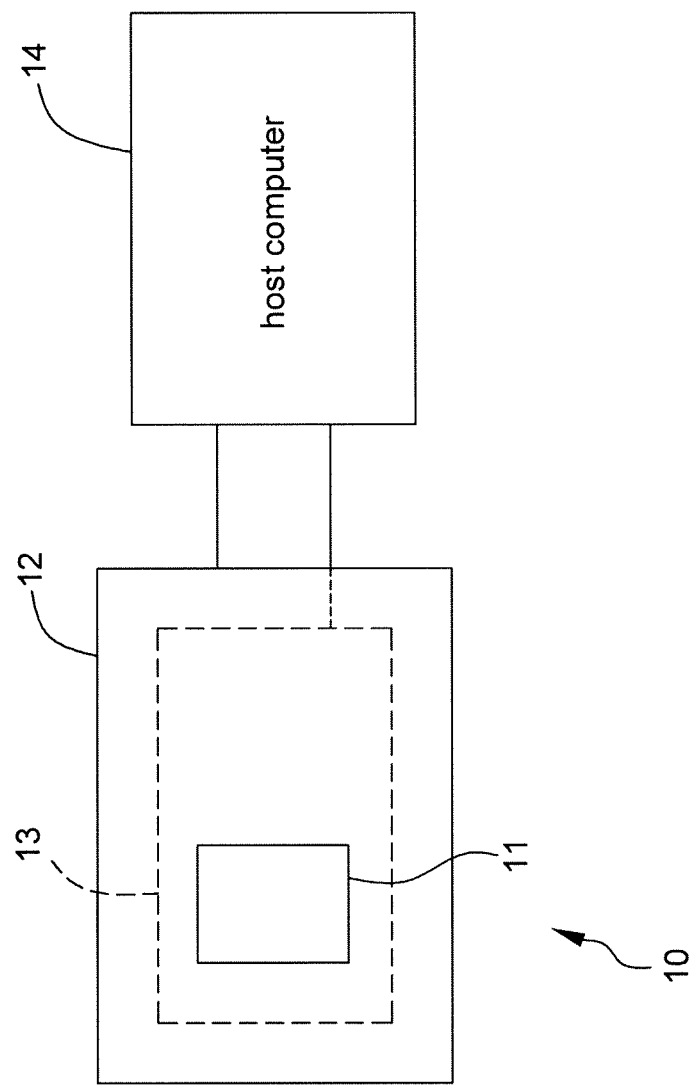
FIG. 1 is a schematic diagram of a surface computer.
Figure 2:
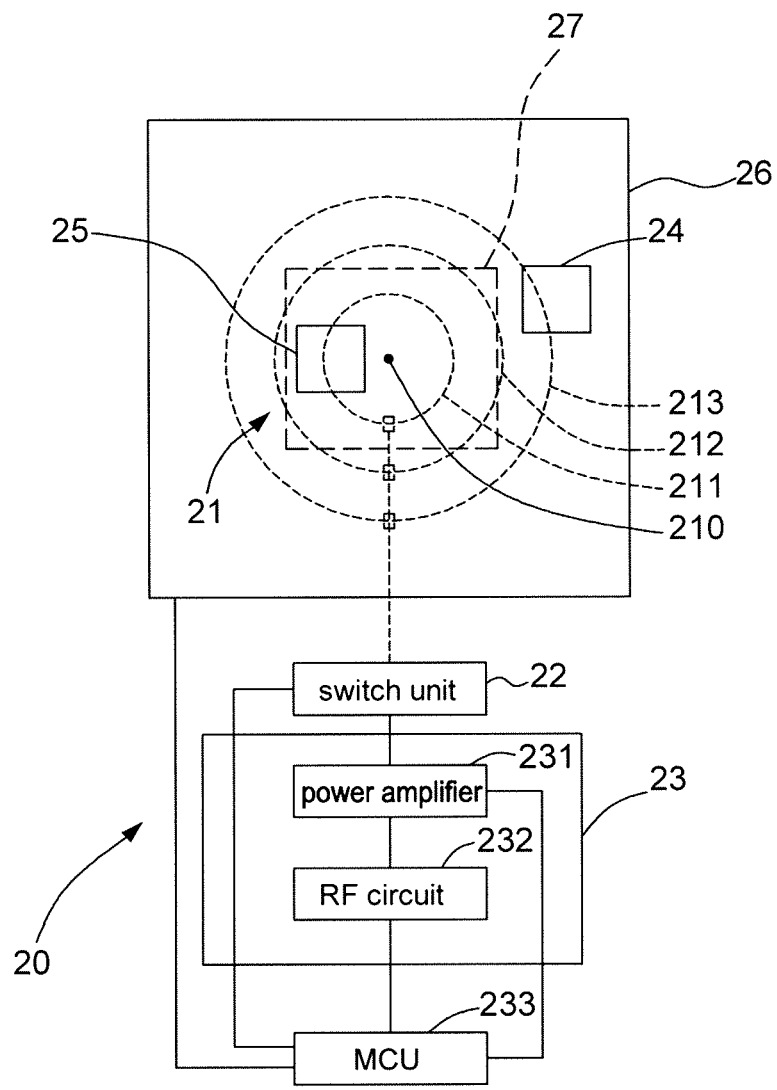
FIG. 2 is a schematic diagram of an RF charging system in accordance with an embodiment of the present invention.

FIG. 2 is a schematic diagram of an RF charging system 20 in accordance with an embodiment of the present invention. The RF charging system 20 comprises an antenna set 21, a switch unit 22 and an RF module 23, an MCU 233 and a display panel 26. The RF charging system 20 can charge an RF device placed on the display panel 26. The RF device is an RFID tag or other portable devices having RFID functions, such as mobile phones, digital cameras, personal digital assistants (PDA), and Moving Picture Experts Group Audio Layer 3 (MP3) players. The antenna set 21 and the RF device are located at different sides of the display panel 26. For example, the RF device is on the display panel 26 and the antenna set 21 is at the back side of the display panel 26. The antenna set 21 comprises a plurality of concentric ring antennas in different sizes, such as loop antennas, and the ring antennas, being concentric, have a same center 210. Referring to FIG. 2, three ring antennas 211 to 213 are illustrated as an example; however, the present invention shall not be limited to the number and type of the ring antennas used in the example. The RF module 23 comprises an RF circuit 232 and a power amplifier 231. The RF circuit 232 is coupled to the MCU 233, and the power amplifier 231 is coupled to the MCU 233, the RF circuit 232 and the switch unit 22. The MCU 233 coupled to the switch unit 22 controls the switch unit 22 to switch between the ring antennas of the antenna set 21. The MCU 233 is further coupled to the display panel 26 to control the display of the display panel 26.

The MCU 233 controls the RF circuit 232 to generate an RF signal, and the power amplifier 231 amplifies the RF signal and provides the amplified RF signal to the switch unit 22. The switch unit 22 transmits the amplified RF signal to one ring antenna, which is selected by the MCU 233 from the antenna set 21. The ring antenna then transmits the amplified RF signal and detects whether the RF device is on the display panel 26 via inductive coupling. More specifically, upon receiving the amplified RF signal, the RF device generates a response signal. The response signal is received by the selected ring antenna and determined by the RF circuit 232 to confirm the presence of the RF device. Then the MCU 233 selects from the antenna set 21 a ring antenna capable of receiving the response signal to charge the RF device.

When the RF device is detected, it means that the RF device is in a detectable range of the selected ring antenna, and therefore a distance between the RF device and the center 210 is estimated accordingly. The size of detectable range is dependent on the size of the ring antenna—the detectable range increases as the size of the ring antenna increases to indicate that the detected RF device is located farther from the center 210; the detectable range decreases as the size of the ring antenna decreases to indicate that the detected RF device is located nearer to the center 210. Therefore, the distance between the RF device and the center 210 is estimated by determining which of the ring antennas detects the RF device. However, the detectable ranges of the ring antennas in different sizes may overlap with one another. For example, the detectable range of the ring antenna 211 is 0 to 15 centimeters from the center 210, and the detectable range of the ring antenna 212 is 5 to 25 centimeters from the center 210. Therefore, on the display panel, the RF device located within an overlapping detectable range of the two antennas 211 and 212 is detected by the two ring antennas 211 and 212 simultaneously. At this point, the distance between the RF device and the center 210 is estimated by the detectable range of the smallest ring antenna having detected the RF device 24. For example, when the RF device 24 is detected by the ring antennas 212 and 213 simultaneously, the distance between the RF device 24 and the center 210 is determined by the detectable range of the smaller ring antenna 212; when the RF device 24 is detected by the ring antennas 211 and 212 simultaneously, the distance between the RF device 24 and the center 210 is determined by the detectable range of the smaller ring antenna 211.

After estimating the distance between the center 210 of the antenna set 21 and the RF device of the display panel 26, the MCU 233 determines whether the RF device is within a predetermined area on the display panel 26 based on the estimated distance. Suppose the predetermined area is a central area 27 of the antenna set 21. The MCU 233 first compares the estimated distance with a threshold. When the estimated distance is smaller than or equal to the threshold, it means that the RF device is within the central area 27; when the estimated value is greater than the threshold, it means that the RF device is not within the central area 27. Since the central area 27 is an area having the highest transmitting/receiving efficiency of the antenna set 21, the MCU 233 controls the display panel 26 to display the central area 27 when it is determined that the RF device is not in the central area 27, so as to direct a user to relocate the RF device to the central area 27. Therefore, the transmitting/receiving efficiency of the antenna as well as the charging efficiency can be increased.

In a preferred embodiment, the MCU 233 controls a power intensity applied by the power amplifier 231 to amplify the RF signal. Apart from according to the smallest ring antenna of the antenna set that detects the presence of the RF device, the distance between the RF device on the display 26 and the center 210 is more accurately estimated further according to the smallest power intensity applied by the smallest ring antenna when detecting the RF device. Provided that the distance between the RF device and the center 210 of the antenna set 21 is more accurately estimated, whether the RF device is within the central area 27 of the antenna set 21 is also more accurately determined. As far as any ring antenna is concerned, as power of an RF signal transmitted therefrom increases, the detectable range of the ring antenna extends both outwardly and inwardly from the ring antenna; that is, the detectable range extends both farther from and nearer to the center 210. In this preferred embodiment, such characteristic is used to more accurately estimate the distance between the RF device and the center 210. The antenna set 21 implementing the above characteristic is described below. When the smallest ring antenna having detected the RF device is the smallest ring antenna (i.e., the ring antenna 211) of the antenna set 21, the RF positioning system 20 determines that the RF device is either inside or outside the smallest ring antenna; when the smallest ring antenna having detected the RF device is other ring antennas (i.e., the ring antennas 212 and 213) of the antenna set 21, the RF positioning system 20 determines that the RF device is inside the smallest antenna. As a result of the smallest ring antenna (i.e., the ring antenna 211) of the antenna set 21 being small enough, an RF device located inside the smallest ring antenna may be detected using the smallest power intensity of the power amplifier 231. Take the antenna set of FIG. 2 as an example. Provided that the smallest ring antenna 211 is small enough and the sizes of the ring antennas 211, 212 and 213 are similar to each other, i.e., the antennas are closely arranged, the foregoing configuration may be achieved. Therefore, when the antenna set 21 is designed according to the foregoing description, for the smallest ring antenna capable of detecting the RF device, the smaller the power intensity used for the detected RF device means the nearer to the center 210 the RF device is located, and vice versa.

In another preferred embodiment, suppose the RF device is capable of transmitting charging information such as the charged energy amount back to the RF device. Thus, before the RF charging system 20 charges, the MCU 233 switches between the ring antennas by controlling the switch unit 23, thereby charging the RF device with each of the antennas capable of receiving the response signal for a predetermined time. The MCU 233 then selects an antenna providing the largest charged energy amount (i.e., having the highest charging efficiency) according to the charged energy amount of the RF device provided by the antennas within the predetermined time, so as to charge the RF device with optimized charging efficiency.

Figure 3:
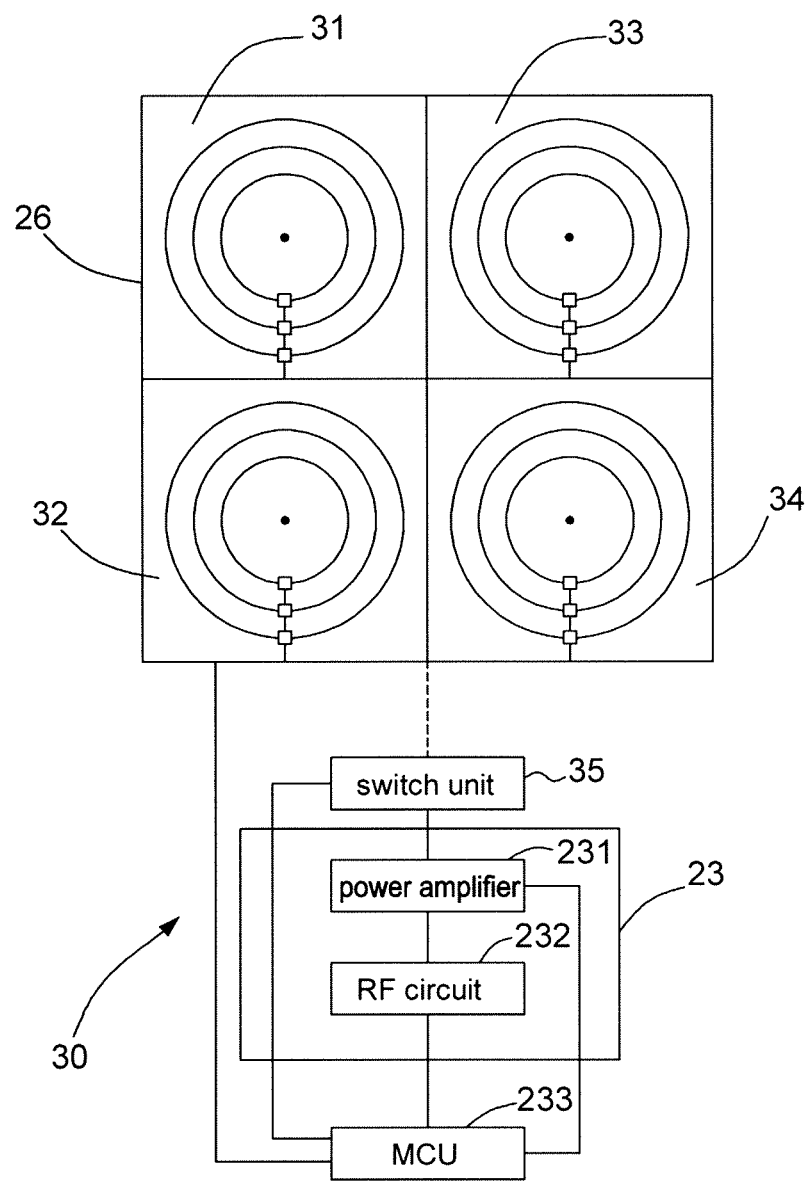
FIG. 3 shows a plurality of antenna sets as an application variation from the embodiment illustrated in FIG. 2.

FIG. 3 shows a plurality of antenna sets as an application variation from the embodiment illustrated in FIG. 2. An RF charging system 30 comprises four antenna sets 31 to 34; however, the present invention shall not be limited to the number of the antenna sets in this embodiment. Each antenna set comprises a plurality of ring antennas; however, the present invention shall not be limited to the number and type of the antennas in this embodiment. Under control of the MCU 233, a switch unit 35 is able to select any ring antenna from any ring antenna set to transmit the RF signal generated by the RF module 23. The RF charging system 30 can estimate a distance between the RF device of the display panel 26 and a center of each antenna set according to the embodiment illustrated in FIG. 2. When the distance indicates that the RF device is not within a central area (i.e., an area having a highest antenna transmitting/receiving efficiency) of the antenna sets, the MCU 233 controls the display panel 26 to display the central area of the antenna sets, so as to direct the user to relocate the RF device to the displayed area.

In another embodiment, the display panel 26 illustrated in FIG. 2 and FIG. 3 has a positioning capability. For example, a touch display panel obtains a position of an RF device by sensing a touch caused by the RF device. Therefore, the RF charging system 20 and 30 can directly determine the position of the RF device via the positioning capability of the display panel 26, and further determine whether the RF device is within an area (i.e., a central area of any antenna set) having a highest antenna transmitting/receiving efficiency. When the answer is no, the MCU 233 controls the display panel 26 to display the area having the highest antenna transmitting/receiving efficiency, so as to direct the user to relocate the RF device to the displayed area to increase charging efficiency. It is to be noted that, the area having the highest antenna transmitting/receiving efficiency is dependent on the types and sizes of the antenna sets. When the antenna sets of the RF charging system 20 and 30 utilize other antennas instead of the ring antennas taken as examples, the area having the highest transmitting/receiving efficiency of the display panel is tested and identified in advance. When the RF device is placed on the display panel 26, whether the RF device is within the area having highest antenna transmitting/receiving efficiency as identified in advance is further determined via the positioning capability of the display panel 26.

Figure 4:
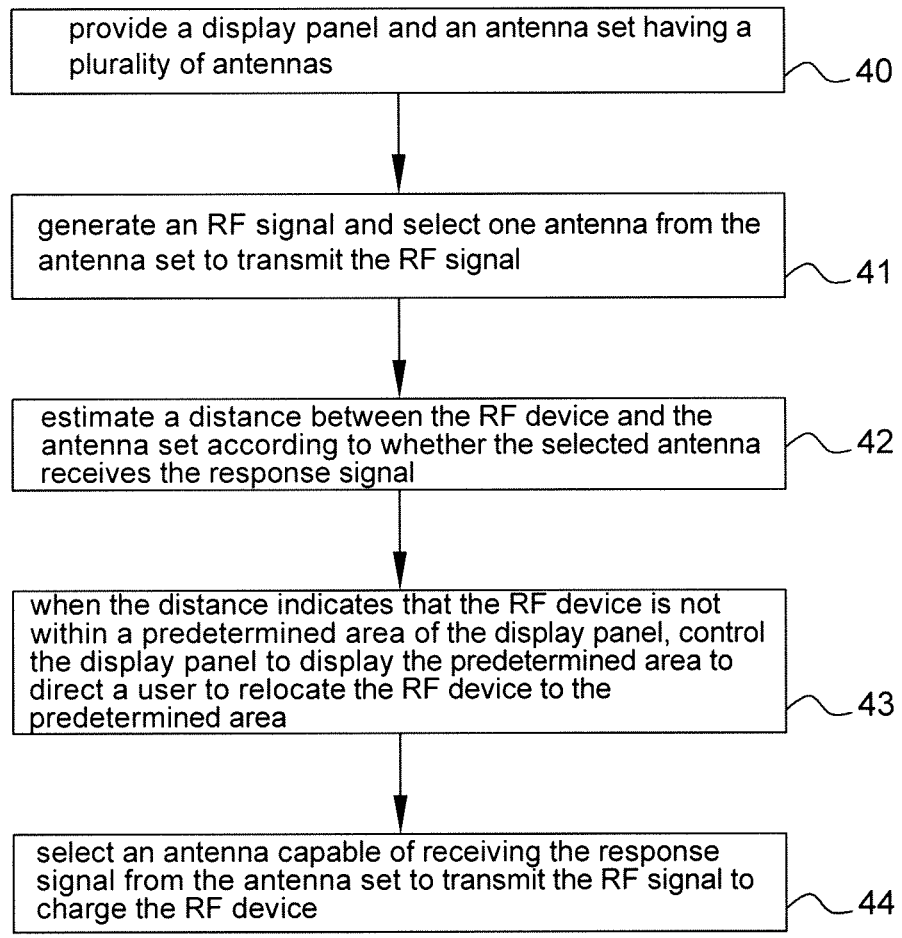
FIG. 4 is a flow chart of an RF charging method in accordance with an embodiment of the present invention.

FIG. 4 is a flow chart of an RF charging method in accordance with an embodiment of the present invention. The RF charging method is for charging an RF device, which generates a response signal upon receiving an RF signal. The RF charging method comprises steps below. In Step 40, a display panel and an antenna set having a plurality of antennas are provided. In Step 41, the RF signal is generated and one antenna is selected from the antenna set to transmit the RF signal. In Step 42, a distance between the RF device and the antenna set is estimated according to whether the selected antenna receives the response signal. In Step 43, when the distance indicates that the RF device is not within a predetermined area of the display panel, the display panel is controlled to display the predetermined area to direct a user to relocate the RF device to the predetermined area. In Step 44, an antenna capable of receiving the response signal is selected from the antenna set to transmit the RF signal to charge the RF device.

In a preferred embodiment, with respect to Step 40, the antenna set and the RF device are located at different sides of the display panel, and the plurality of antennas of the antenna set are concentric ring antennas in different sizes with a same center. In Step 42, the distances between the RF device and the antenna sets are determined according to the distance between the RF device and the center. The distance between the RF device and the center is estimated according to a smallest ring antenna capable of receiving the response signal and a smallest power intensity of the RF signal transmitted by the smallest ring antenna. In Step 43, the predetermined area is a central area, of the antenna set, having the highest transmitting/receiving efficiency. When the distance between the RF device and the center is greater than a threshold, the display panel is controlled to display the central area. Step 44 further comprises respectively charging the RF device with each antenna capable of receiving the response signal for a predetermined time, and selecting an antenna capable of receiving the response signal according to a charged energy amount of the RF device provided by each antenna capable of receiving the response signal, thereby charging the RF device.

Figure 5:
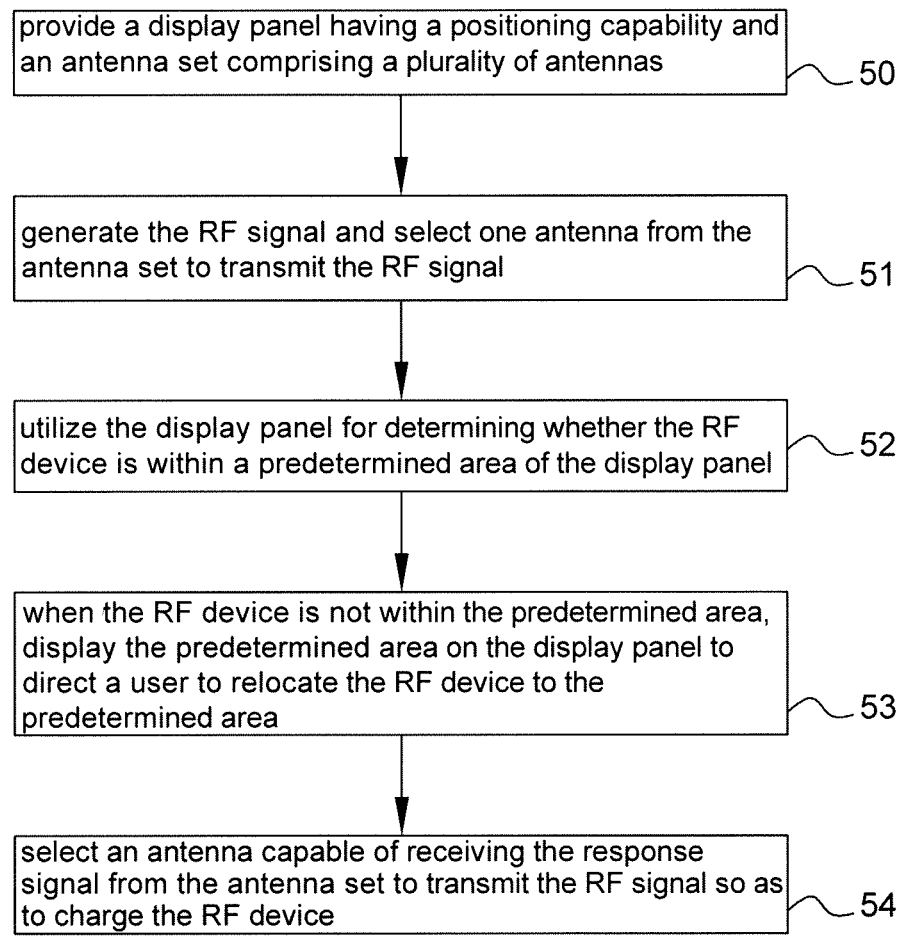
FIG. 5 is a flow chart of another RF charging method in accordance with another embodiment of the present invention.

FIG. 5 is a flow chart of an RF charging method in accordance with another embodiment of the present invention. The RF charging method is for charging an RF device, which generates a response signal upon receiving an RF signal. The RF charging method comprises steps below. In Step 50, a display panel having a positioning capability and an antenna set comprising a plurality of antennas are provided. In Step 51, the RF signal is generated and one antenna is selected from the antenna set to transmit the RF signal. In Step 52, the display panel is used for determining whether the RF device is within a predetermined area of the display panel. In Step 53, when the RF device is not within the predetermined area, the predetermined area is displayed on the display panel to direct a user to relocate the RF device to the predetermined area. In Step 54, an antenna capable of receiving the response signal is selected from the antenna set to transmit the RF signal, thereby charging the RF device.

In a preferred embodiment, with respect to Step 50, the display panel is a touch display panel, the antenna set and the RF device are located at different sides of the display panel, and the plurality of antennas of the antenna set are concentric ring antennas in different sizes with a same center. In Step 52, the predetermined area is a central area of the antenna set. Step 54 further comprises charging the RF device with each antenna capable of receiving the response signal for a predetermined time, and selecting one antenna capable of receiving the response signal according to a charged energy amount of the RF device provided by each antenna capable of receiving the response signal, so as to charge the RF device.

In conclusion, an RF charging system and method thereof is capable of positioning an RF device on a display panel when the RF device is being charged. When the RF device is not within an area having high antenna transmitting/receiving efficiency, the display panel is controlled to display the area to direct a user to relocate the RF device to the area, thereby increasing charging efficiency.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency (RF) charging system, for charging an RF device that generates a response signal upon receiving an RF signal, the RF charging system comprising:

an antenna set, comprising a plurality of antennas;

a switch unit, coupled to the antenna set;

an RF module, coupled to the switch unit, for generating the RF signal;

a microcontroller unit (MCU), coupled to the switch unit and the RF module, for controlling the switch unit to select from the antenna set an antenna that receives the response signal and has a highest transmit/receive efficiency among the plurality of antennas, and transmitting the RF signal through the selected antenna to charge the RF device; and a display panel, coupled to the MCU, wherein the MCU estimates a distance between the RF device and the antenna set according to whether the antennas receive the response signal, and controls the display panel to display a predetermined area when the estimated distance indicates that the RF device is not within the predetermined area of the display panel, and wherein the antenna comprises concentric ring antennas in different sizes having a same center, and the MCU estimates the distance between the RF device and the center according to a smallest ring antenna capable of receiving the response signal.

2. The RF charging system as claimed in claim 1, wherein the antenna set and the RF device are located on opposite sides of the display panel.

3. The RF charging system as claimed in claim 1, wherein the MCU estimates the distance between the RF device and the center further according to a smallest power intensity of the RF signal transmitted by the smallest ring antenna.

4. The RF charging system as claimed in claim 3, wherein the predetermined area is a central area of the antenna set, and the MCU controls the display panel to display the predetermined area when the estimated distance between the RF device and the center is greater than a threshold.

5. The RF charging system as claimed in claim 1, wherein the RF device is a portable electronic device having a radio frequency identification (RFID) function.

6. The RF charging system as claimed in claim 1, wherein the RF module comprises:
    an RF circuit, coupled to the MCU, for generating the RF signal under control of the MCU; and
    a power amplifier, coupled to the RF circuit and the switch unit, for amplifying the RF signal and providing the amplified RF signal to the selected antenna.

7. The RF charging system as claimed in claim 6, wherein the MCU is further coupled to the power amplifier and is utilized for controlling a power intensity of the power amplifier for amplifying the RF signal.

8. The RF charging system as claimed in claim 1, wherein the MCU controls the switch unit to switch between the antennas so that the antennas that receive the response signal charge the RF device for a predetermined time, and the MCU selects one of the antennas that receives the response signal to charge the RF device according to a charged energy amount of the RF device provided by the antennas that receive the response signal during the predetermined time.

9. An RF charging system, for charging an RF device that generates a response signal upon receiving an RF signal, the RF charging system comprising:
    a display panel, for detecting a position of the RF device;
    an antenna set, having a plurality of antennas, wherein the antennas are concentric ring antennas in different sizes having a same center;
    a switch unit, coupled to the antenna set;
    an RF module, coupled to the switch unit, for generating the RF signal; and
    an MCU, coupled to the display panel, the switch unit and the RF module, for controlling the switch unit to select one antenna from the antenna set, so as to transmit the RF signal generated by the RF module and determining whether the selected antenna receives the response signal;
    wherein, the MCU transmits the RF signal via the antenna capable of receiving the response signal, so as to charge the RF device, and when the position of the RF device indicates that the RF device is not within a predetermined area of the display panel, the MCU controls the display panel to display the predetermined area.

10. The RF charging system as claimed in claim 9, wherein the display panel is a touch control panel.

11. The RF charging system as claimed in claim 9, wherein the RF device is a portable electronic device having an RFID function.

12. The charging system as claimed in claim 9, wherein the RF module comprises:
    an RF circuit, coupled to the MCU, for generating the RF signal under control of the MCU; and
    a power amplifier, coupled to the RF circuit and the switch unit, for amplifying the RF signal and providing the amplified RF signal to the selected antenna.

13. The RF charging system as claimed in claim 9, wherein the antenna set and the RF device are located on opposite sides of the touch control panel.

14. The RF charging system as claimed in claim 13, wherein the predetermined area is a central area of the antenna set.

15. The RF charging system as claimed in claim 9, wherein the MCU controls the switch unit to switch the antennas so that each of the antennas that receives the response signal respectively charges the RF device for a predetermined time, and the MCU selects one antenna that receives the response signal according to a charged energy amount of the RF device provided by the each of the antennas that receive the response signal during the predetermined time, so as to charge the RF device.

* * * * *